United States Patent
Asano

(10) Patent No.: US 7,295,906 B2
(45) Date of Patent: *Nov. 13, 2007

(54) VEHICLE STABILITY CONTROL DEVICE

(75) Inventor: Kenji Asano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

This patent is subject to a terminal disclaimer.

(21) Appl. No.: 11/062,953

(22) Filed: Feb. 23, 2005

(65) Prior Publication Data

US 2005/0216156 A1    Sep. 29, 2005

(30) Foreign Application Priority Data

Mar. 5, 2004  (JP) ............................ 2004-062381

(51) Int. Cl.
  *G05D 1/00*   (2006.01)
(52) U.S. Cl. ....................................................... 701/41
(58) Field of Classification Search .................. 701/41
  See application file for complete search history.

(56) References Cited

U.S. PATENT DOCUMENTS 7,073,621 B2 * 7/2006 Koibuchi et al. ............. 180/421

2003/0221898 A1   12/2003  Yasui et al.

FOREIGN PATENT DOCUMENTS

| DE | 38 26 982 C2 | 2/1989 |
|----|--------------|--------|
| DE | 40 38 079 A1 | 6/1992 |
| DE | 101 50 605 A1 | 4/2003 |
| JP | B2-2540742 | 7/1996 |
| JP | A-2003-291838 | 10/2003 |

\* cited by examiner

*Primary Examiner*—Thu V. Nguyen
(74) *Attorney, Agent, or Firm*—Oliff & Berridge, PLC

(57) ABSTRACT

A vehicle stability control device for reducing and/or canceling a yaw moment owing to the imbalance in longitudinal forces between the left and right wheels of the vehicle by automatically steering wheels. The control device estimates a longitudinal force difference-caused yaw moment and a vertical load shift-caused yaw moment exerted on the vehicle body. A steering apparatus is operated to apply on the vehicle body a counter yaw moment obtained by eliminating a contribution of the vertical load shift-caused yaw moment from a counter yaw moment calculated from the longitudinal force difference-caused yaw moment.

4 Claims, 3 Drawing Sheets

VEHICLE STABILITY CONTROL DEVICE

BACKGROUND OF THE INVENTION

1. Field of the Invention

The present invention relates to a device for controlling a stability of a behavior of a vehicle such as an automobile, and more specifically, to such a device that stabilizes the running behavior of a vehicle by controlling a steering angle of wheels.

2. Description of Prior Art

When a vehicle is running on a road surface having different frictional coefficients, e.g. dried in one side and wet or frozen in the other side, an imbalance in braking or traction forces exerted on tires (road reaction forces) would arise between the left and right wheels of the vehicle, generating a yaw moment turning the vehicle head undesirably. Such an imbalance in braking or traction forces, deteriorating its running behavior (e.g. straight line stability), could be large especially during the execution of Traction control (TRC) and/or Anti-skid (ABS) control, because the forces on wheels are individually controlled to suppress excessive increase in slippage of the respective tires, depending upon different road conditions. Then, so far, there have been developed control devices for stabilizing a vehicle running behavior by reducing and/or canceling the effect of a yaw moment owing to a braking or traction force imbalance, especially under TRC and/or Anti-skid control.

One of examples of such vehicle stability control devices for a vehicle running behavior is disclosed in Japanese Patent No. 2540742, in which, during Anti-skid control, wheels are steered independently of a driver's steering (handling) action so as to generate a counter yaw moment opposite to, and canceling the yaw moment owing to a braking force imbalance between the left and right wheels on a vehicle. The counter yaw moment, determined based upon braking forces or pressures actually applied for the respective wheels, is generated through the automatic steering of the wheels in the direction of turning the vehicle head from the higher frictional side (the side on which the higher braking (backward) force is exerted) to the lower frictional side (the side on which the lower braking force is exerted). In order to accomplish this stability control, a vehicle is equipped with a steering apparatus or mechanism enabling the steering of wheels independently of a driver's steering action.

Vehicle stability control devices as described above are directed to the reducing and/or canceling of effects of a braking or traction force imbalance owing to a difference of road conditions that wheels of a vehicle contact on, successfully improving its straight-line stability. However, the operations of the above-mentioned stability control devices are unexpectedly affected by the force imbalance arising from a vertical load shift in the lateral (left and right) direction of a vehicle such as during the turning of a vehicle. For instance, a vertical load shift owing to centrifugal force in a turning vehicle increases the braking or traction force on its turning outside wheels. Thus, even on a uniform road surface, if determined simply based upon the actually applied braking or traction forces, the counter yaw moment, and in turn, the automatic steering amount, would be generated unexpectedly in view of the purpose of the stability control, deteriorating a course tracking ability of a vehicle.

Accordingly, conventional vehicle stability control devices as described above may be improved to appropriately operate, taking into account a vertical load shift in the lateral direction of a turning vehicle.

SUMMARY OF INVENTION

According to the present invention, there is provided a novel vehicle stability control device for reducing and/or canceling effects of a braking or traction force imbalance owing to a difference of road conditions through controlling a steering angle of the vehicle, thereby stabilizing a vehicle running behavior, especially during turning the vehicle.

In one aspect of the present invention, the inventive device may be equipped on a vehicle for controlling its running behavior. A steering apparatus of the vehicle is adapted to steer a wheel independently of a driver's steering operation. The inventive device comprises a portion of estimating individual longitudinal forces on the respective wheels; a portion of calculating a yaw moment exerted on a vehicle body caused by a difference of the longitudinal forces between the left and right wheels (longitudinal force difference-caused yaw moment); a portion of calculating a yaw moment exerted on the vehicle body caused by a vertical load shift in the left and right direction of the vehicle body (vertical load shift-caused yaw moment). In a steering control portion of the inventive device, a counter yaw moment is first calculated for canceling at least partially the longitudinal force difference-caused yaw moment. The resultant counter yaw moment is then modified by eliminating a contribution of the vertical load shift-caused yaw moment to the counter yaw moment therefrom. The steering apparatus is controlled through the steering of at least one wheel to apply the modified counter yaw moment on the vehicle body.

Here, it should be understood that longitudinal forces on wheels are barking or traction forces imparted on the respective wheels from a road surface during deceleration or acceleration of the vehicle. A longitudinal force on each wheel is a function of a vertical load on the corresponding wheel and a frictional coefficient of the road surface the wheel contacts on. Thus, as described above, during the turning of a vehicle, the vertical load shift toward the tuning outside (inside) of the vehicle increases (decreases) the longitudinal forces on the corresponding wheels, which would unexpectedly vary the amount of the counter yaw moment.

In the present invention, however, through the moment-based calculation, the effects of the vertical load shift is eliminated from a counter yaw moment to be actually generated by the steering apparatus (modified counter yaw moment). Thus, a counter yaw moment exerted through the steering control is appropriate or just enough for reducing and/or canceling effects of a braking or traction force imbalance owing to a difference of road conditions even during the turning of a vehicle, suppressing unexpected generation, increase or decrease of a yaw moment exerted on a vehicle body.

In the moment-based calculation, the counter yaw moment, first calculated in the steering control portion, may be a reversed longitudinal force difference-caused yaw moment, i.e. a yaw moment directed opposite to, and having the same magnitude as, the longitudinal force difference-caused yaw moment. Then, the modified counter yaw moment may be obtained by adding the vertical load shift-caused yaw moment to the first calculated counter yaw moment. Accordingly, the modified counter yaw moment will be a yaw moment directed opposite to, and having the same magnitude as, the longitudinal force difference-caused yaw moment from which the vertical load shift-caused yaw moment is subtracted. According to the above-mentioned calculation, a counter yaw moment substantially free of the effects of the vertical load shift can be obtained without deducing the difference in the force components owing to different frictional coefficients on the road surface.

The vertical load shift-caused yaw moment may be calculated based upon a lateral acceleration of the vehicle body. The amount of the vertical load shift in the left and right direction of the vehicle body is increased along with its lateral acceleration, so that the magnitude of the vertical load shift-caused yaw moment will be larger at a larger magnitude of the lateral acceleration. In this regard, more in details, the vertical load shift-caused yaw moment may be estimated under an assumption that a vehicle is turning on a road surface having a uniform frictional characteristic. In the purpose of the stability control devices the present invention is directed to, no counter yaw moment should be generated on a road having a uniform frictional characteristic even during the turning of a vehicle. In other words, the deviation from a yaw moment that expected for a vehicle running on a uniform frictional surface is to be cancelled by the resultant counter yaw moment. Thus, in calculating the modified counter yaw moment, the moment component owing to the vertical load shift during the turning of a vehicle, i.e. to be eliminated from the actually exerted longitudinal force difference-caused yaw moment, may be considered to be a yaw moment which would be generated on a vehicle turning on a uniform frictional surface. On a uniform road, longitudinal forces on individual wheels are considered to be proportional to vertical loads on the respective wheels so that the vertical load shift-caused yaw moment may be given by calculating the distribution of the vertical load among wheels of a vehicle.

Longitudinal forces on wheels may be estimated using braking or driving forces or torques applied from braking apparatus and/or driving apparatus of a vehicle (braking pressures and/or engine torques imparted on the respective wheels). More in details, a longitudinal force on each wheel may be obtained as a function of a braking or driving torque from the braking and/or driving apparatus and a wheel angler acceleration.

For operating the steering apparatus based upon the resultant modified yaw moment, in the steering control portion, preferably, a provisional target steering angle for the steered wheel, first calculated based upon a steering operational amount of the driver and a predetermined steering characteristic, is modified into a target steering angle for the steered wheel based upon the modified counter yaw moment. Based upon the resultant target steering angle, the steering control portion may control the steering angle through the steering apparatus. Thus, the steering control by the inventive device can be compatible with the steering operational amount of the driver and predetermined steering characteristic. If required, the steering control by the inventive device may be executed independently of the driver's handling operation.

When a slip ratio of each wheel is controlled not to increase excessively, depending upon the corresponding road frictional condition, such as through ABS control or TRC as described above, the longitudinal force imbalance owing to different frictional characteristics on a road surface will become large. Thus, the steering control by the inventive device will be advantageously executed together with the above-mentioned slip ratio controls (It should be understood that the steering control by the inventive device may not be executed in absence of slip ratio control.). As noted, the modification of the counter yaw moment in the present invention is directed to the elimination of effects of the vertical load shift owing to the turning of a vehicle. Thus, when a vehicle is running in a straight course, the process of the modification of the counter yaw moment may not be executed. In this case, the counter yaw moment derived from the longitudinal force difference-caused yaw moment may be used for the steering control by the inventive device.

Upon executing any other barking and driving force control, such as a vehicle behavior stabilizing control through adjusting longitudinal forces on the respective wheels (VSC with tire forces; TF-VSC) and a braking and driving force distribution control, the modification of the counter yaw moment may be prohibited for avoiding any conflict among those controls.

Accordingly, it is an object of the present invention to provide new and novel vehicle stability control devices for a vehicle, such as automobile, by generating a counter yaw moment through the steering of wheels for reducing and/or canceling a yaw moment owing to the imbalance in longitudinal forces between the left and right wheels of the vehicle.

It is another object of the present invention to provide such devices appropriately operating even during the turning of a vehicle without unexpected generation, increase or decrease of the counter yaw moment by taking into account effects of a vertical load shift in the left and right or lateral direction of a vehicle.

It is a further object of the present invention to provide such devices wherein the contribution of a yaw moment owing to a vertical load shift in the lateral direction of a vehicle is eliminated from the control amount in the steering control.

It is a further object of the present invention to provide such devices wherein the control amount for steering wheels is determined through calculation of moments without analyzing the force components on the respective wheel owing to different frictional characteristics on a road surface.

It is another object of the present invention to provide such devices wherein a yaw moment owing to a vertical load shift is estimated under an assumption that a vehicle is running on a uniform frictional road surface.

It is another object of the present invention to provide such devices wherein undesirable and unexpected modification of the counter yaw moment is avoided especially during the turning of a vehicle.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1:
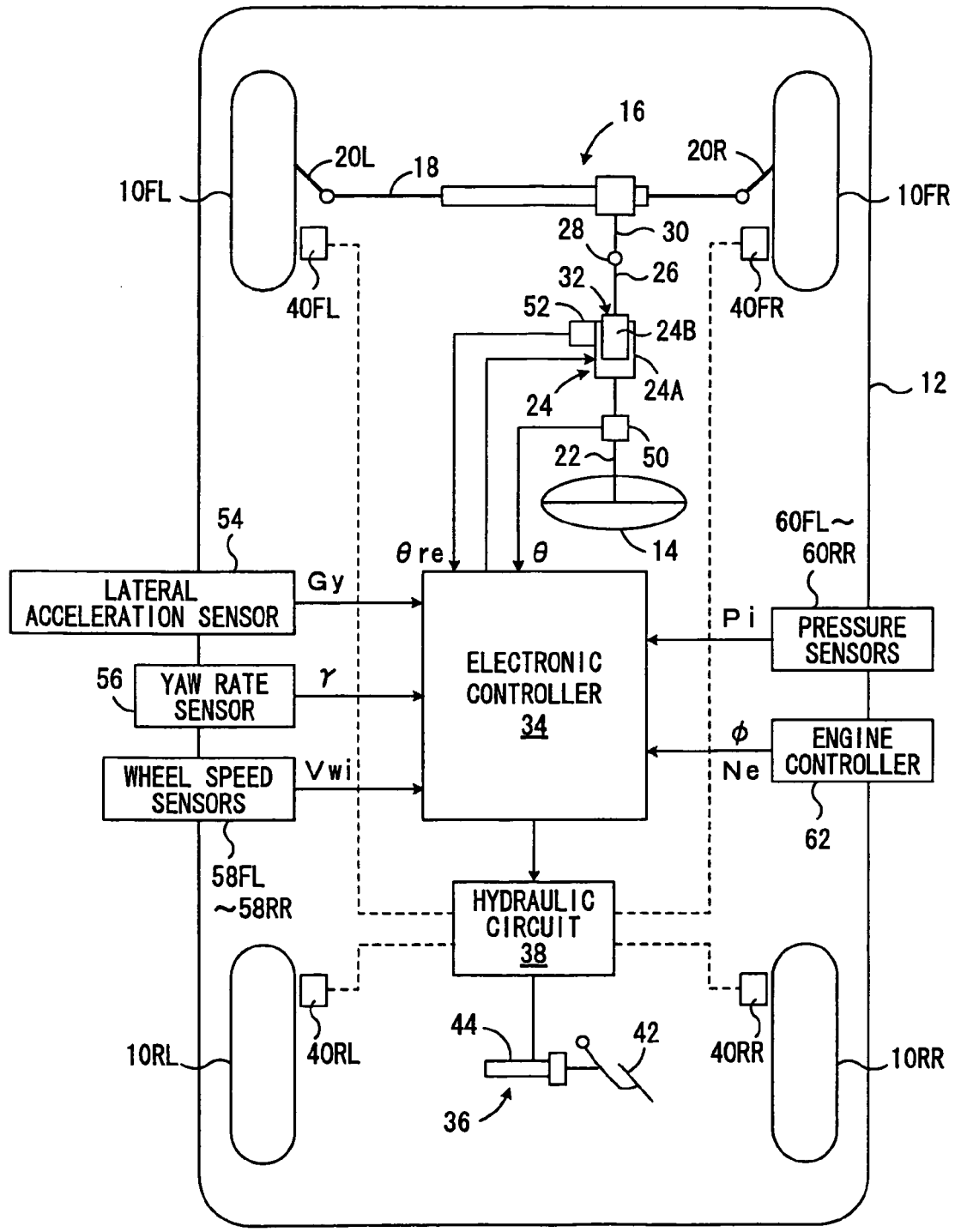
FIG. 1 is a diagrammatical view of a four wheeled, rear drive vehicle equipped with a turning angle varying apparatus of a semi-steer-by-wire type serving as an automatic steering apparatus and a vehicle stability control device according to the present invention.

FIG. 1 diagrammatically shows a four-wheeled, rear drive vehicle incorporating a preferred embodiment of a vehicle stability control device according to the present invention. In this drawing, a vehicle body 12 has left and right front wheels 10FL and 10FR, left and right rear-wheels 10RL, 10RR. As usual, the vehicle is formed to transmit a driving torque or a rotational driving force, outputted from an engine (not shown) according to a throttle valve opening in response to the depression of an acceleration pedal by a driver, to the rear wheels 10RL and 10 RR through a differential gear system, etc. (not shown).

Front wheels 10FL, 10FR each are steered through tie rods 20L, R with a rack-and-pinion-type power-steering device 16 actuated in response to the rotation of a steering wheel 14 by a driver. For automatically steering the wheels, however, the steering device 16 employed here is of a semi-steer-by-wire type, provided with a turning angle varying apparatus 24 as an auxiliary steering apparatus which enables the control of the steering angle of the front wheels independently of the driver's handling.

The turning angle varying apparatus 24 includes a driving motor 32, including a housing 24A, operationally linking to the steering wheel 14 via an upper steering shaft 22, and a rotor 24B, operationally linking to a pinion shaft 30 via a lower steering shaft 26 and a universal joint 28. The driving motor 32 rotates the lower steering shaft 26 relative to the upper steering shaft 22 under the control of an electronic control 34 as described later. If any failure occurs in the rotational driving motion in the apparatus 24, the housing 24A and rotor 24B are mutually, mechanically locked by a locking device (not shown), preventing the relative rotation of the upper and lower steering shafts. For controlling the operation of the turning angle varying apparatus 24, a steering angle $\theta$ of the steering wheel 14, i.e. the rotational angle $\theta$ of the upper steering shaft 22, and a relative angle $\theta$re of the lower steering shaft 26 measured from the upper steering shaft 22 (between the housing 24A and rotor 24B) are detected with angular sensors 50 and 52, respectively.

The power steering device 16 may be either of hydraulic power steering type or of electric power steering type. However, for reducing a torque reaction transmitted from the apparatus 24 to the steering wheel 14 during the automatic steering control, preferably employed is a rack-coaxial type electric power steering device having a motor and a mechanism for converting the motor's rotational torque into a linear motional force of the rack bar 18.

A braking system 36, generating braking force on each wheel, has a hydraulic circuit 38 comprising a reservoir, an oil pump and various valves, etc. (not shown), wheel-cylinders 40FL, 40FR, 40RL and 40RR, equipped on the respective wheels, and a master cylinder 44 actuated in response to the depression of a brake pedal 42 by the driver. In the braking system, a braking pressure in each wheel cylinder, and in turn, the braking force on each wheel, are adjusted through the hydraulic circuit 38 in response to a master cylinder pressure.

The braking pressure in each wheel cylinder may also be controlled by the electronic control 34 upon controlling a slip ratio on each wheel, such as Anti-skid control or TRC and TF-VSC as known in the art. During braking the vehicle, when a braking slip on one of the wheels 10FL-10RR is excessive (e.g. larger than a reference value), Anti-skid control will be executed to adjust the braking pressure of the corresponding wheel within a predetermined range, preventing the wheel from being locked. Similarly, during accelerating the vehicle, when a driving slip on one of the rear wheel 10RL, RR is excessive (e.g. larger than a reference value), TRC will be executed to adjust the braking pressure of the corresponding wheel for rendering the driving slip to fall in a predetermined range. For the TF-VSC, braking pressures for the wheel are controlled to generate a yaw moment for stabilizing the vehicle behavior when the vehicle falls into deteriorated conditions, i.e. a spin condition or a drift-out condition. The deterioration of the vehicle behavior may be monitored by calculating a spin condition value and/or a drift-out condition value, derived from a lateral acceleration of the vehicle body, etc. as known in the art. For controlling the braking pressures, pressure sensors 60i (i=FL, FR, RL, RR) for detecting the pressures Pbi (i=fl, fr, rl, rr) in the wheel-cylinders 40FR-40RL are installed.

Electronic controller 34, controlling the turning angle varying apparatus 24 and the braking pressures (braking force) of the respective wheels, may be of an ordinary type, including a microcomputer having CPU, ROM, RAM, and input/output port devices, interconnected with the bidirectional common bus, and drive circuits. As seen from FIG. 1, inputted to the controller 34 are signals of: the steering angle $\theta$ of the steering wheel 14; the relative angle $\theta$re of the lower steering shaft; a lateral acceleration Gy, detected with a lateral acceleration sensor 54; a yaw rate $\gamma$, detected with a yaw rate sensor 56; wheel velocities Vwi (i=fl, fr, rl and rr are front left, front right, rear left and rear right, respectively), detected with wheel velocity sensors 58FL-50RR mounted on the corresponding wheels 10FL-10RR; pressures Pbi (i=fl, fr, rl, rr) in the wheel-cylinders 40FR-40RL; and an accelerator opening $\Phi$ and engine speed (the number of revolutions) Ne, provided from an engine controller 62.

As noted, the controller 34 executes the steering gear ratio control and automatic steering control, as well as the control of slip ratios on the wheels.

Under normal conditions, the controller 34 controls the turning angle varying apparatus 24 through the rotation of the motor 32 to vary a steering gear ratio, i.e. the ratio of the steering angle of the front wheels to the rotational angle of the steering wheel 14, providing a predetermined steering characteristic. In operation, a steering gear ratio Rg for accomplishing a predetermined steering characteristic is first determined in a portion in the controller 34 using a map shown in FIG. 3, based upon a vehicle speed V which may be calculated with the wheel velocities Vwi. Then, a target steering angle (provisional) $\delta$st is calculated by:

$$\delta st = \theta / Rg \qquad (1),$$

and the turning angle varying apparatus 24 is actuated to steer the front wheels, adjusting their steering angle to $\delta$st. Thus, in this case, the turning angle varying apparatus 24 functions as a steering gear ratio varying apparatus.

In this connection, the target steering angle (provisional) $\delta$st is considered a sum of the steering angle corresponding to an actual amount of a driver's steering action (a rotational angle of the steering wheel 14), equal to $\theta$/Rgo, and a control amount for obtaining a predetermined characteristic. $\delta$st may also be a function of a steering angler speed, for improving a transient response of the vehicle motion. It should be noted that the steering gear ratio may be determined in other ways known in the art.

When an imbalance in longitudinal forces between the left and right wheels of the vehicle arises, the controller 34 executes the automatic steering control, in which the turning angle varying apparatus 24 (the driving motor 32) is commanded to steer the front wheels 10FL, 10FR independently of the rotation of the steering wheel 14, thereby generating a counter yaw moment for canceling the yaw moment owing to the longitudinal force imbalance. Thus, in this case, the turning angle varying apparatus 24 functions as an automatic steering apparatus. In this respect, it should be noted that, according to the present invention, the contribution of the force imbalance owing to a vertical load shift in the lateral direction of the vehicle body during the turning of the vehicle is eliminated from an actually exerted counter yaw moment in the automatic steering control.

In operation, first, a yaw moment Mf generated by the longitudinal force imbalance (longitudinal force difference-caused yaw moment) is estimated as follows:

$$Mf = \frac{T}{2}\{(Fxfr + Fxrr) - (Fxfl + Fxrl)\}, \qquad (2)$$

where T is a tread of the vehicle; and Fxi (i=fr, fl, rr, rl) are the longitudinal forces on the respective wheels. Mf is defined as positive in the counterclockwise direction in FIG. 1. Fxi is defined as positive in the forward direction.

Fxi for each wheel may be estimated as follows:

$$Fxi = \frac{Ji \cdot dVwi - Txi}{R}, \qquad (3)$$

where Ji is an inertial moment of a wheel; dVwi, an angular acceleration of the wheel, obtained by differentiating the wheel speed Vwi; Txi, a net torque applied on the wheel, i.e. a sum of braking torque (<0) and driving torque (>0); and R, an effective radius of the wheel. The braking torque may be determined with braking pressure Pbi and appropriate factors. The driving torque may be determined with an engine torque derived from the accelerator opening φ and engine speed Ne. The net torque may also be measured directly with any sensors.

If the vehicle is running in a straight line, the resultant yaw moment Mf are caused by the longitudinal force imbalance owing to such as different frictional characteristics of road surfaces which the respective wheels contact on, or a vertical load difference in the vehicle's lateral direction due to other than centrifugation force. That is, the yaw moment Mf is to be cancelled through the automatic steering control. Accordingly, a counter yaw moment Mc to be generated through the automatic steering is set to −Mf:

$$Mc \leftarrow -Mf \qquad (4a).$$

During the turning of the vehicle, the centrifugation force increases the vertical load, and in turn, the longitudinal forces, on the turning outside wheels relative to on the turning inside wheels. The effect of this vertical load shift toward the tuning outside is incorporated in the estimation of the yaw moment Mf and the counter yaw moment Mc: In braking the vehicle, the vertical load shift biases the yaw moment Mf toward the understeering direction, so that the counter yaw moment Mc is shifted toward the turning inside, rendering the vehicle liable to oversteer unexpectedly beyond the purpose of the automatic steering control. In accelerating the vehicle, on the other hand, the vertical load shift biases the yaw moment Mf toward the oversteering direction, so that the counter yaw moment Mc is shifted toward the turning outside, rendering the vehicle liable to understeer unexpectedly. Thus, in the inventive automatic steering control, as noted, the effects of the vertical load shift during the turning of the vehicle is eliminated from the counter yaw moment Mc through the moment-based calculation as described below.

During the turning of the vehicle, the counter yaw moment Mc is modified to be:

$$Mc \leftarrow -(Mf-Mg) \text{ or } Mc+Mg \qquad (4b),$$

where Mg is a yaw moment component owing to the vertical load shift, i.e. a vertical load shift-caused yaw moment. Mg may be derived as follows:

Firstly, it may be considered that Mc should be zero when the vehicle is turning on a uniform road surface. Thus, Mg may be considered as a yaw moment to be generated under an assumption that the vehicle is turning on a uniform frictional surface. On a road surface having a uniform frictional coefficient, longitudinal forces on the wheels are proportional to vertical loads on the respective wheels. Thus, by distributing the total longitudinal braking or traction forces Fx in the vehicle onto the left and right wheels at a distribution ratio of the vertical loads, Mg is given by:

$$Mg = \left(Fx\frac{Fzr}{Fzr + Fzl} - Fx\frac{Fzl}{Fzr + Fzl}\right) \cdot \frac{T}{2}, \qquad (5)$$

where Fzl, Fzr are the vertical loads of the left front and rear wheels and the right front and rear wheels, respectively. The vertical loads Fzl and Fzr may be given by:

$$Fzl = Fzlo - \frac{M \cdot Gy \cdot H}{T}, \text{ and } Fzr = Fzro + \frac{M \cdot Gy \cdot H}{T}, \qquad (6)$$

where Fzlo and Fzro are the vertical loads of the left front and rear wheels and the right front and rear wheels under the resting state of the vehicle, respectively; M and H are the vehicle weight and the height of the vehicle centroid, respectively. Gy is the lateral acceleration, defined as positive leftwards in FIG. 1. Consequently, Mg may be given by:

$$Mg = Fx \cdot \frac{Gy \cdot H}{Kg}, \qquad (7)$$

where Kg is a gravitational acceleration, i.e. M·Kg=Fzl+Fzr=Fzlo+Fzro. Fx may be given by the total sum of Fxi, calculated in exp. (3).

The vertical loads in exp. (5) may be measured directly with appropriate sensors.

Then, for generating the counter yaw moment Mc in exps. (4a) or (4b) as calculated above, a portion in the controller 34 commands the turning angle varying apparatus 24 to steer the front wheels.

It should be noted that the counter yaw moment Mc in exp. (4b) is considered substantially free of the effect of the vertical load shift owing to the centrifugation force during the turning of the vehicle. Accordingly, a steering amount provided by the automatic control may be substantially just enough to cancel the force imbalance owing to the different frictional characteristics of a road surface even during the turning of the vehicle, thereby suppressing the oversteering and/or understeering tendencies during braking and/or accelerating a vehicle as described above. It should be understood by one of ordinary skill in the art that Mf and Mg may be determined in any ways other than the expressions as shown above.

Figure 2:
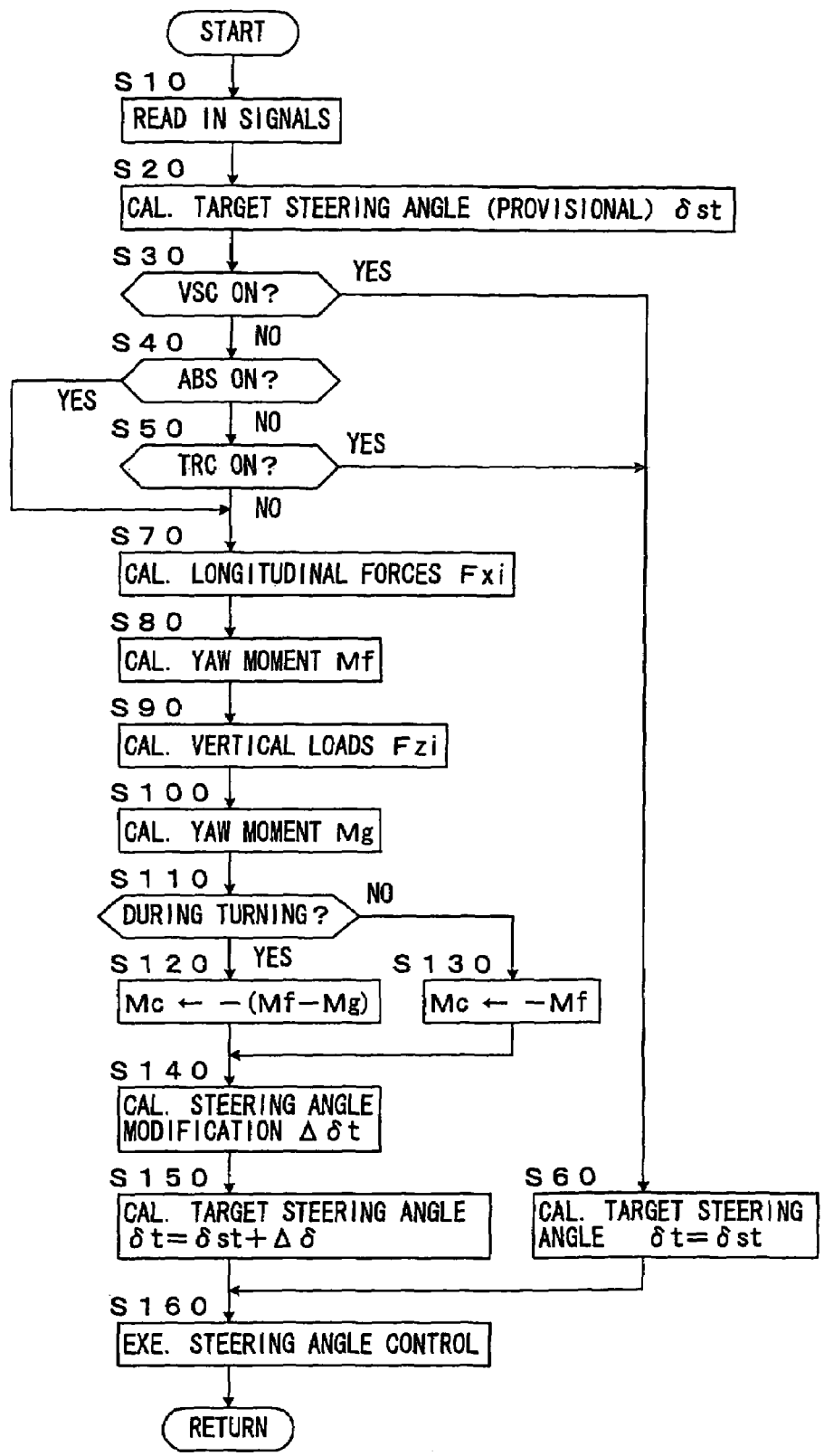
FIG. 2 is a flowchart of a vehicle stability control routine executed in the preferred embodiments in the vehicle in FIG. 1 according to the present invention for controlling the steering angle of the left and right front wheels.

The flow chart in FIG. 2 shows an exemplary control routine for accomplishing the vehicle stability control through the automatic steering control as described above. In this embodiment, the automatic steering control is executed when Anti-skid control or TRC is executed but not TF-VSC through adjusting braking forces. This is partially because, upon executing Anti-skid control or TRC, the tire forces are considered to increase to its maximum level so that further variation of the forces is difficult. In such a case, the automatic steering control is especially useful for correcting the vehicle behavior. On the other hand, in absence of Anti-skid or TRC control, the vehicle running behavior can be corrected through the adjusting of the braking forces. Furthermore, during the execution of the TF-VSC through adjusting braking forces, it would be difficult to make the automatic steering control compatible with the adjusting of braking forces, since both the controls intend to generate the respective target yaw moments. However, it should be noted by one of ordinary skill in the art that the inventive automatic steering control may be executed under the execution of TF-VSC and other controls, such as braking and driving force distribution control with any slight modifications, and those cases are considered to be within the scope of the present invention.

Referring to FIG. 2, the control routine may be started by a closure of an ignition switch (not shown in FIG. 1) and cyclically repeated at a cycle time such as milli-seconds during the operation of the vehicle.

Figure 3:
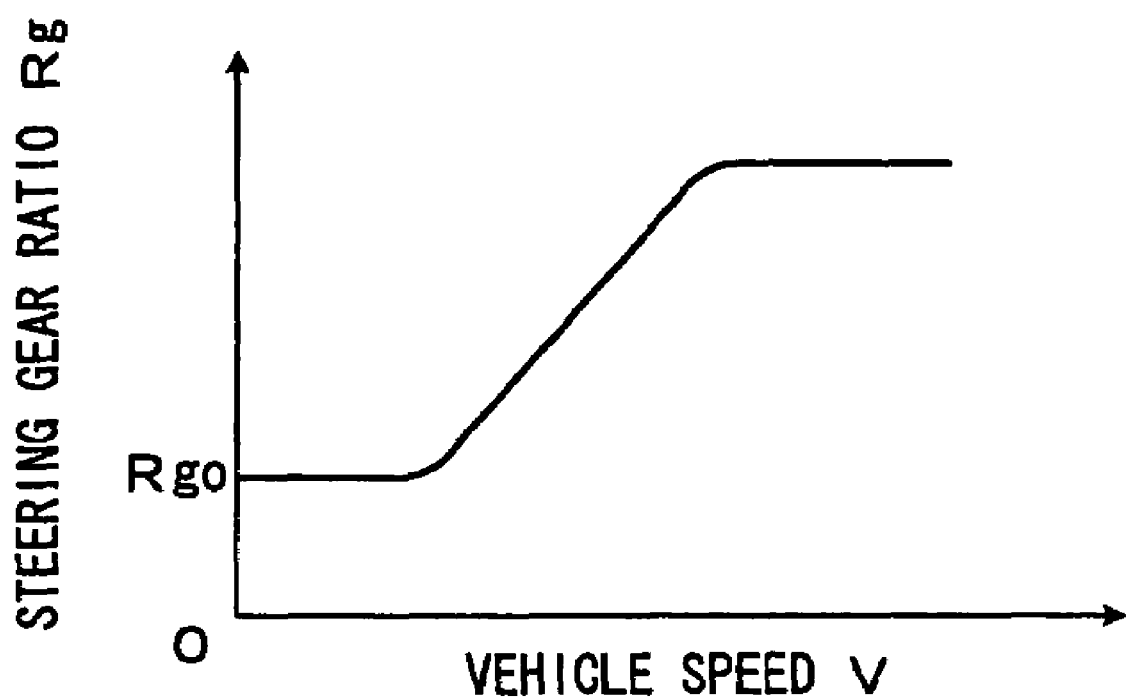
FIG. 3. shows a map of a relation between a vehicle speed V and a steering gear ratio Rg.

In this routine, firstly, signals as described above are read-in (step 10) and the target steering angle (provisional) δst is determined with exp. (1), using a map as shown in FIG. 3 (step 20). Then, in steps 30-50, it is judged if the TF-VSC through the adjusting of braking force is executed (step 30) and if either of Anti-skid control or TRC is executed (steps 40, 50). As shown, if TF-VSC is executed or if neither Anti-skid control nor TRC is executed, no automatic steering control is executed as described above and the provisional target steering angle δst is used as a target steering angle δt for the turning angle varying apparatus 24 (step 60).

On the other hand, if either of Anti-skid control or TRC is executed, a longitudinal force difference-caused yaw moment Mf and a vertical load shift-caused yaw moment Mg are calculated using exps. (2), (3), and (5) or (7) through steps 70-100. Then, it is judged in step 110 if the vehicle is turning by judging e.g. if the yaw rate γ exceeds a reference value γo. During turning, a target counter yaw moment Mc is set to −(Mf−Mg) in exp. (4b): a modified target yaw moment. Otherwise, such as when the vehicle is running in a straight course or stops, the target yaw-moment is set to −Mf in exp. (4a). Subsequently, based upon the resultant Mc, a steering angle modification Δδt is calculated (step 140), and a target steering angle δt is determined as δt=δst+Δδt (step 150). In this connection, a target steering angle δt may be determined based upon Mc without using the provisional one δst.

Finally, in step 160, the turning angle varying apparatus 24 is operated so as to rotate the lower steering shaft 26 relative to the upper steering shaft, thereby steering the front wheels 10 Fl, FR to the target steering angle δt determined in step 60 or 150.

Although the present invention has been described in detail with respect to preferred embodiments thereof and some partial modifications thereof, it will be apparent for those skilled in the art that other various modifications are possible with respect to the shown embodiments within the scope of the present invention.

For instance, the inventive control device may be employed in a front drive vehicle and a four wheel drive vehicle. As a steering apparatus, a full steer-by-wire power steering system may be employed. Further, the automatic steering control may be applied for steering rear wheels. It should be noted that the generation of the counter yaw moment in accordance with the present invention may be done through the control of braking and driving forces on wheels as in TF-VSC. Electronic controller for the inventive steering control may be provided separately those for Anti-skid control, TRC or TF-VSC.

The invention claimed is:

1. A device for controlling a stability of a vehicle having a vehicle body, wheels and a steering apparatus being able to steer a wheel independently of a driver's steering operation, the device comprising a portion of estimating individual longitudinal forces on the respective wheels; a portion of calculating a longitudinal force difference-caused yaw moment exerted on the vehicle body caused by a difference of the longitudinal forces between the left and right wheels; a portion of calculating a vertical load shift-caused yaw moment exerted on the vehicle body caused by a vertical load shift in the left and right direction of the vehicle body; and a steering control portion of calculating a counter yaw moment for canceling at least partially the longitudinal force difference-caused yaw moment and controlling the steering apparatus through the steering of a wheel to apply on the vehicle body a modified counter yaw moment obtained by eliminating a contribution of the vertical load shift-caused yaw moment to the counter yaw moment therefrom.

2. A device according to claim 1, wherein the vertical load shift-caused yaw moment calculating portion calculates the vertical load shift-caused yaw moment based upon a lateral acceleration of the vehicle body, a magnitude of the vertical load shift-caused yaw moment being larger at a larger magnitude of the lateral acceleration.

3. A device according to claim 1, wherein the steering control portion calculates a provisional target steering angle for the steered wheel based upon a steering operational amount of the driver and a predetermined steering characteristic; calculates a target steering angle for the steered wheel by modifying the provisional target steering angle based upon the modified counter yaw moment; and controls the steering angle based upon the target steering angle through the steering apparatus.

4. A device according to claim 1, wherein the vertical load shift-caused yaw moment is calculated under an assumption that the vehicle is running on a uniform road surface.

* * * * *